US011985740B2

(12) United States Patent
Binder et al.

(10) Patent No.: US 11,985,740 B2
(45) Date of Patent: May 14, 2024

(54) METHOD FOR OPERATING A LIGHT EMITTING DIODE ARRANGEMENT, METHOD FOR CHARACTERIZING A LIGHT EMITTING DIODE, AND LIGHT EMITTING DIODE ARRANGEMENT

(71) Applicant: OSRAM Opto Semiconductors GmbH, Regensburg (DE)

(72) Inventors: Michael Binder, Barbing (DE); Holger Specht, Bad Abbach (DE); Maximilian Tauer, Thanstein (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 155 days.

(21) Appl. No.: 17/612,896

(22) PCT Filed: Jun. 4, 2020

(86) PCT No.: PCT/EP2020/065545
§ 371 (c)(1),
(2) Date: Nov. 19, 2021

(87) PCT Pub. No.: WO2020/249469
PCT Pub. Date: Dec. 17, 2020

(65) Prior Publication Data

US 2022/0256664 A1 Aug. 11, 2022

(30) Foreign Application Priority Data

Jun. 11, 2019 (DE) ..................... 10 2019 115 817.6

(51) Int. Cl.
*H05B 45/00* (2022.01)
*H05B 45/14* (2020.01)
*H05B 45/58* (2020.01)

(52) U.S. Cl.
CPC ............. *H05B 45/14* (2020.01); *H05B 45/58* (2020.01)

(58) Field of Classification Search
CPC ...... H05B 45/00; H05B 45/10; H05B 45/325; H05B 45/50; H05B 45/58
See application file for complete search history.

(56) References Cited

U.S. PATENT DOCUMENTS 6,049,175 A * 4/2000 Forsberg .............. H04B 10/502 372/38.07
2003/0071821 A1* 4/2003 Sundahl ................. H05B 45/10 345/589

(Continued)

FOREIGN PATENT DOCUMENTS

DE 10 2009 014 998 A1 9/2010
EP 1 932 137 6/2008

(Continued)

OTHER PUBLICATIONS

Xingtong Jiang et al: "An Electrooptical OLED Model for Prediction and Compensation of AMOLED Aging Artifacts", S 1 D International Symposium. Digest of Technical Papers, vol. 49, No. 1, May 1, 2018 (May 1, 2018), pp. 441-444, XP055725451 (Year: 2018).*

(Continued)

*Primary Examiner* — Thai Pham
(74) *Attorney, Agent, or Firm* — HAUPTMAN HAM, LLP

(57) ABSTRACT

A method for operating a light emitting diode arrangement with at least one light emitting diode includes the steps of: a) determining at least one instantaneous current-voltage value pair; b) matching the instantaneous current-voltage value pair with an original current-voltage value pair; and c) determining an updated current feed based on the matching (Continued)

and driving the light emitting diode with the updated current feed.

14 Claims, 7 Drawing Sheets

(56) References Cited

U.S. PATENT DOCUMENTS

| | | | | |
|---|---|---|---|---|
| 2008/0084169 | A1 * | 4/2008 | Wendt | H05B 45/18 315/307 |
| 2008/0252571 | A1 * | 10/2008 | Hente | G09G 3/3208 345/76 |
| 2011/0169494 | A1 * | 7/2011 | Zudrell-Koch | H05B 45/60 324/414 |
| 2012/0290241 | A1 * | 11/2012 | Nguyen | H05B 45/58 702/65 |

FOREIGN PATENT DOCUMENTS

| | | | |
|---|---|---|---|
| EP | 2 523 008 | A1 | 11/2012 |
| WO | 2007/036837 | A2 | 4/2007 |
| WO | 2010/034509 | A2 | 4/2010 |

OTHER PUBLICATIONS

Xingtong Jiang et al: "An Electrooptical OLED Model for Prediction and Compensation of AMOLED Aging Artifacts", S 1 D } I International Symposium. Digest of Technical Papers, vol. 49, No. 1, May 1, 2018 (May 1, 2018), pp. 441-444, XP055725451 (Year: 2018) (Year: 2018).*

International Search Report issued for corresponding International Patent Application No. PCT/EP2020/065545 dated Sep. 8, 2020, along with an English translation.

Written Opinion issued for corresponding International Patent Application No. PCT/EP2020/065545 dated Sep. 8, 2020.

Jiang et al., "An Electro-optical OLED Model for Prediction and Compensation of AMOLED Aging Artifacts", SID Symposium Digest of Technical Papers, vol. 49, No. 1, May 30, 2019, pp. 441-444.

Binder M. et al.; "Investigations on correlation between I-V characteristic and internal quantum efficiency of blue (AlGaIn)N lightemitting diodes", Applied Physics Letters 103, 221110; Nov. 26, 2013; abstract only.

* cited by examiner

METHOD FOR OPERATING A LIGHT EMITTING DIODE ARRANGEMENT, METHOD FOR CHARACTERIZING A LIGHT EMITTING DIODE, AND LIGHT EMITTING DIODE ARRANGEMENT

CROSS REFERENCE TO RELATED APPLICATION

This application is a National Stage of International Application No. PCT/EP2020/065545, filed on Jun. 4, 2020, which designates the United States and was published in Europe, and which claims priority to German Patent Application No. 10 2019 115 817.6, filed on Jun. 11, 2019, in the German Patent Office. Both of the aforementioned applications are hereby incorporated by reference in their entireties.

The present application relates to a method for operating a light emitting diode arrangement, a method for characterizing a light emitting diode and a light emitting diode arrangement.

The optical characterization of light emitting diodes is often very time consuming or technically difficult to realize, especially when a light emitting diode arrangement, such as a display device comprises a plurality of light emitting diodes. In particular, it is not readily possible to monitor the light-emitting diodes during operation of the light-emitting diode arrangement with regard to their aging behavior and the associated change in the emitted light output. Such aging effects can be directly reflected in a faulty color control or color rendering or brightness control.

It is an object to obtain the characterization and/or the aging of light emitting diodes with respect to their efficiency of light generation in a simple and reliable way.

These objects are solved inter alia by the methods and a light emitting diode arrangement according to the independent patent claims. Further embodiments and conveniences are the subject of the dependent patent claims.

A method for operating a light-emitting diode arrangement and a light-emitting diode arrangement are specified. The light-emitting diode arrangement is particularly suitable for operation in accordance with the method described. Features specified in connection with the method can therefore also be used for the light-emitting diode arrangement, and vice versa.

Features specified below in connection with at least one embodiment or one exemplary embodiment of the method and/or one embodiment or one exemplary embodiment of the light-emitting diode arrangement can also be combined with other features described in connection with at least one embodiment or one exemplary embodiment of the method and/or the light-emitting diode arrangement, as long as they are not mutually exclusive or it is not explicitly specified to the contrary.

For example, the light emitting diode arrangement with at least one light emitting diode is driven with an instantaneous current feed. For example, the instantaneous current feed is the current feed at which the light emitting diode is configured to emit a specified light intensity. For example, the light emitting diode is configured to be operated in multiple dimming levels, wherein an instantaneous current feed for the light emitting diode is provided for each dimming level.

The current feed is adjustable in particular by means of a change in the intensity of current and/or by means of pulse width modulation.

According to at least one embodiment of the method, the method comprises a step in which at least one instantaneous current-voltage value pair of the light-emitting diode is determined. This current-voltage value pair is part of the instantaneous current-voltage characteristic of the light-emitting diode. For example, a certain predefined voltage is applied and the corresponding current is measured or vice versa.

According to at least one embodiment of the method, the method comprises a step of matching the instantaneous current-voltage value pair with an original current-voltage value pair. The original current-voltage value pair is stored, for example, in a memory of the light-emitting diode arrangement.

According to at least one embodiment of the method, an updated current feed is determined based on the matching and the light emitting diode is driven with the updated current feed.

By means of the change in the updated current feed compared to the previously instantaneous current feed, changes in the light emitting diode and an associated change in the efficiency of the radiation generation can be compensated for. In particular, the updated current feed can be determined solely by a purely electrical characterization of the light emitting diode. A measurement of the light power emitted by the light emitting diode can be dispensed with.

According to at least one embodiment of the method, aging of the light emitting diode is at least partially compensated for by determining the updated current feed. In other words, the updated current feed is determined such that, during operation with the updated current feed, a light output is emitted by the light emitting diode which corresponds at least approximately to an original light output of the light emitting diode at an original current feed. This consideration of the aging does not take place by means of a stored expected, typical aging curve, but on the basis of a concrete determination of the current-voltage value pair. Thus, the reliability of the method does not require for the aging of the light emitting diode to follow a predetermined scheme.

For example, the updating of the current feed occurs after a specified operating period or at specified operating intervals. Alternatively or additionally, the updating of the current feed can also be triggered at a specific point in time.

According to at least one embodiment of the method, the light-emitting diode arrangement comprises at least one further light-emitting diode, wherein an updated current feed is determined for the further light-emitting diode on the basis of an individually determined instantaneous current-voltage value pair.

In the case of a light emitting diode arrangement with a plurality of light emitting diodes, an updated current feed can therefore be determined individually for a plurality of light emitting diodes and in particular also for each light emitting diode on the basis of a specific measurement at the respective light emitting diode.

With other words, the aging behavior of the individual light emitting diodes of the light emitting diode arrangement can be determined individually by a purely electrical measurement and can subsequently be compensated or at least partially compensated by updating the respective current feed. Thus, the method can also achieve a reliable compensation of aging effects if the light emitting diodes of the light emitting diode arrangement show a different aging behavior.

According to at least one embodiment of the method, a current lies in the low current regime of the light emitting diode when determining the instantaneous operating voltage. In particular, a current density lies between 0.01 $A/cm^2$ and 10 $A/cm^2$ inclusive, for example between 0.02 $A/cm^2$ and 2 $A/cm^2$ inclusive. In this region of operating current density, the efficiency of a light emitting diode depends strongly on the material quality. Aging effects are particularly pronounced in this current regime. These can lead, for example, to faulty color control or color reproduction in display devices. This effect can be counteracted with the method described.

According to at least one embodiment of the method, the light emitting diode arrangement is configured for operating the light emitting diode with a plurality of dimming levels, wherein an associated updated current feed is determined for each dimming level. The method thus takes into account that, for example, aging effects have different effects for different current feeds. This means that the current feed is not increased by the same percentage for all dimming levels. Rather, the required current feed is updated separately for the individual dimming levels.

According to at least one embodiment of the method, an updated efficiency of the light emitting diode for different dimming levels is determined based on the deviation between the instantaneous current-voltage value pair and the original current-voltage value pair. In other words, the measurement of the voltage at a current or vice versa is used to obtain an adjustment of the current feed for different dimming levels based on the updated efficiency.

According to at least one embodiment of the method, the determination of the updated efficiency of the light emitting diode is based on an equivalent circuit in which an ideal radiating diode is brigded by a parasitic non-radiating diode with a series resistor. The ideal radiating diode and the non-radiating diode are thus electrically connected in parallel. In this equivalent circuit, the series resistor of the parasitic non-radiating diode determines the portion that flows through the branch of the non-radiating diode. Thus, the lower the series resistance, the greater the fraction of the current that flows across the non-radiating diode and consequently makes no contribution to light generation. It has turned out that the aging behavior of a light-emitting diode can be characterized essentially by a change in series resistance alone when this equivalent circuit is used as a basis. The change in the other parameters, for example the ideality factor of the non-radiating diode, can be neglected.

According to at least one embodiment of the method, an updated series resistance is determined based on the at least one instantaneous current-voltage value pair, and the updated current feed is determined based on the updated series resistance. In particular, the updated current feed can be determined for a plurality of dimming levels or, in particular, for all dimming levels. With other words, the updated series resistance can be determined based on an operating voltage at a specified operating current or analogously based on an operating current at a specified operating voltage, in particular in the low current regime. This series resistance is sufficient to carry out the corresponding updating of the current feed for several or all dimming levels.

According to at least one embodiment of the method, a correspondingly updated current feed for the dimming level is determined for several dimming levels in each case on the basis of the respective associated instantaneous current-voltage value pair. In this case, the determination of the series resistance based on the aforementioned equivalent circuit can be dispensed with. For example, the original operating voltages with the associated operating currents, i.e. the original current-voltage value pairs, are stored in a memory for the respective dimming levels.

According to at least one embodiment, the light-emitting diode arrangement comprises a light-emitting diode and a drive circuit, wherein the light-emitting diode arrangement is configured to determine an instantaneous current-voltage value pair of the light-emitting diode and to determine an updated current feed for the light-emitting diode on the basis of the instantaneous current-voltage value pair.

Based on the instantaneous current-voltage value pair, it is thus possible to determine how the current feed needs to be updated to compensate for a changed behavior of the light emitting diode, for example due to aging effects.

According to at least one embodiment of the light emitting diode arrangement, the light emitting diode arrangement is a display device with a plurality of light emitting diodes. The light emitting diode arrangement is configured, for example, to determine an instantaneous current-voltage value pair for each of the light emitting diodes and to determine an updated current feed for the light emitting diodes based on the respective instantaneous current-voltage value pairs. The light emitting diode arrangement is thus configured to determine for different light emitting diodes an updated current feed for the light emitting diodes in each case on the basis of concrete individual measurements.

According to at least one embodiment of the light-emitting diode arrangement, the light-emitting diode arrangement comprises a memory in which characteristic values for the light-emitting diode are stored for its original current-voltage characteristic. For example, the characteristic values are based on an equivalent circuit in which an ideal radiating diode is bridged by a parasitic non-radiating diode with a series resistor.

According to at least one embodiment of the light emitting diode arrangement, the light emitting diode arrangement comprises a memory in which a plurality of original current-voltage value pairs are stored for the light emitting diode. Based on these original current-voltage-value pairs, aging effects can be detected by measuring the instantaneous current-voltage-value pair and compensated for accordingly.

According to at least one embodiment of the light emitting diode arrangement, the light emitting diode arrangement can be calibrated based on an original current-voltage characteristic. The original current-voltage characteristic is, for example, one or more current-voltage value pairs or the characteristic value for its original current-voltage characteristic. The original current-voltage characteristic can be used for calibration, for example, for brightness correction. This can be done prior to delivery of the light emitting diode arrangement or during operation, in particular prior to aging of the light emitting diode arrangement.

Furthermore, a method for characterizing a light emitting diode with respect to its internal light generation efficiency is specified. According to at least one embodiment of the method for characterizing a light emitting diode, current-voltage value pairs for the light emitting diode are determined. The current-voltage value pairs are approximated based on an equivalent circuit in which an ideal radiating diode is bridged by a parasitic non-radiating diode with a series resistor. The series resistor is matched with a characteristic series resistor for the light-emitting diode.

With the method described, for example, purely electrical measurements of operating current and associated operating voltage can be used for a known type of light-emitting diode to obtain information about the internal efficiency of light generation, in particular about the internal quantum efficiency. Instead of costly optical characterizations of the light-emitting diodes, a purely electrical measurement can be performed during manufacture to check them with respect to their efficiency.

According to at least one embodiment of the method, the light emitting diode is selected out if a deviation of the series resistance from the characteristic series resistance exceeds a specified tolerance value. The specified tolerance value is, for example, an absolute deviation or a percentage deviation.

Further embodiments and conveniences will be apparent from the following description of the exemplary embodiments in conjunction with the figures.

Elements that are the same, similar, or have the same effect are indicated in the figures with the same reference signs.

The figures are each schematic representations and therefore not necessarily to scale. Rather, comparatively small elements and, in particular, layer thicknesses may be shown exaggeratedly large for clarification or better understanding.

Figure 1:
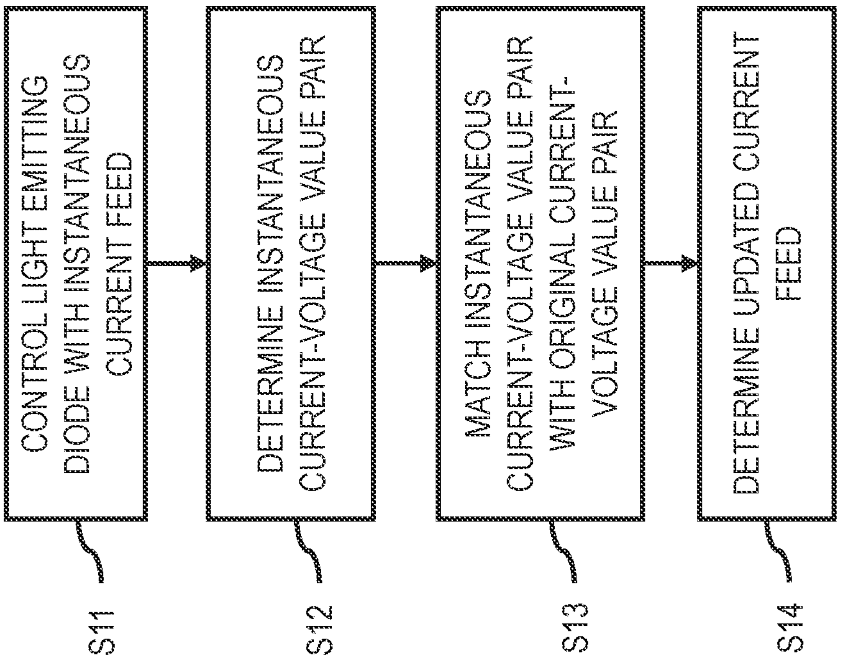
FIG. 1 shows an exemplary embodiment for a method for operating a light emitting diode arrangement in schematic representation.

In the exemplary embodiment shown in FIG. 1, a light emitting diode of a light emitting diode arrangement is controlled with an instantaneous current feed through the light emitting diode (illustrated by step S11).

For the exemplary embodiment of the method, an instantaneous current-voltage value pair is determined. For this purpose, the associated voltage is measured for a specified current. Alternatively, the associated current can be measured for a specified voltage. The current present when determining the current-voltage value pair can, but does not necessarily have to, be at an intensity of current typical for operation of the light emitting diode arrangement (step S12). Depending on the sensitivity of the measurement, it may be more appropriate to perform the measurement in a region that is not typical for the actual operation of the light emitting diode arrangement.

The instantaneous current-voltage value pair is matched with an original current-voltage value pair (step S13). An updated current feed is determined based on the matching so that the light emitting diode can be further driven with the updated current feed (step S14). For example, the updated current feed differs from the instantaneous current feed by a changed intensity of current and/or a changed pulse width modulation.

The method is particularly suitable for at least partially compensating for aging of the light emitting diode by determining the updated current feed.

Figure 3A:
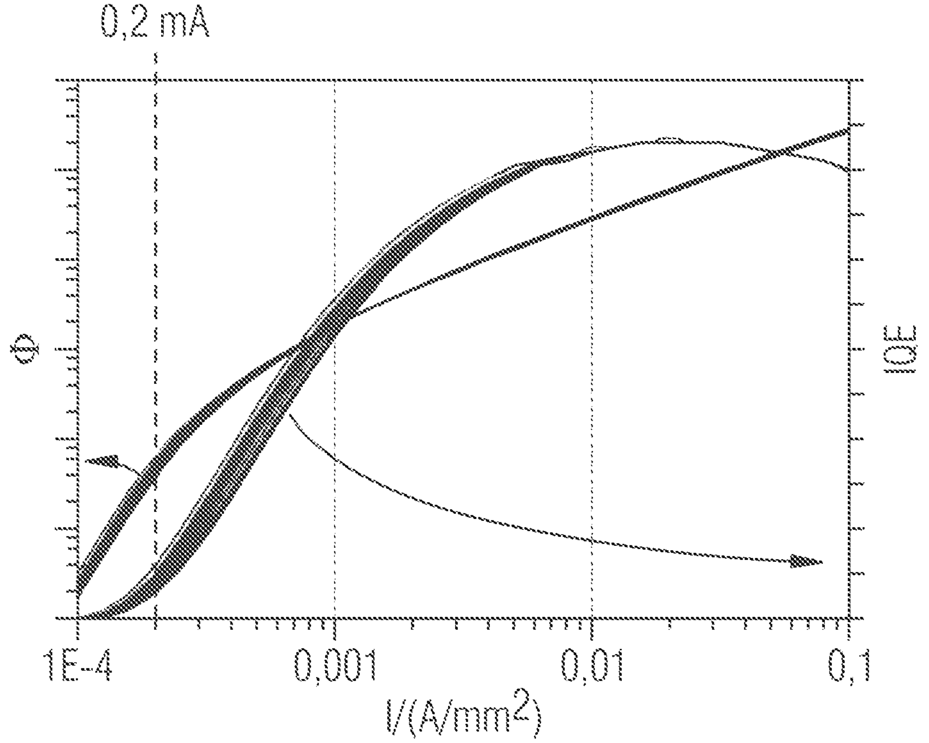
FIG. 3A shows measurement results of a luminous flux in arbitrary units (left scale, logarithmic) and the internal quantum efficiency in arbitrary units (right scale) as a function of the current density I/(A/cm$^2$) for a light emitting diode, wherein the different measurement curves were recorded at operating times between 0 hours and 600 hours.

FIG. 3A illustrates how the luminous flux (and the internal quantum efficiency IQE for a light emitting diode change over an operating period of 600 hours. In particular, the curves show that at comparatively small currents, such as at current densities between and including $1\times10^{-4}$ A/mm$^2$ and including 0.01 A/mm$^2$, aging effects occur. At higher current densities, however, the luminous flux and the internal quantum efficiency change only slightly.

Figure 3B:
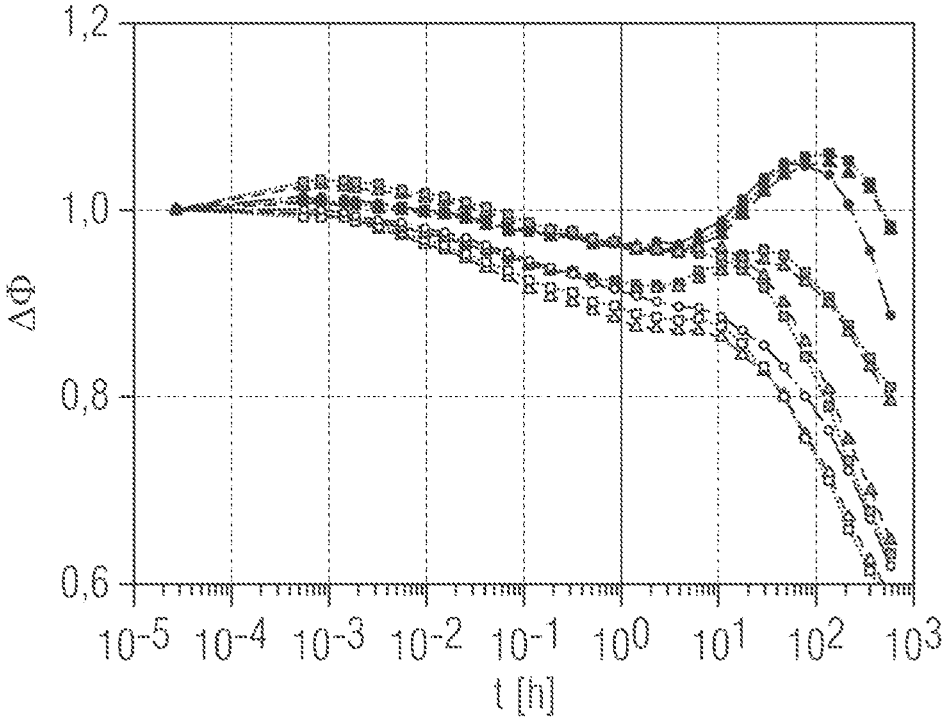
FIG. 3B shows measurements of the change of the luminous flux as a function of the operating time normalized to the luminous flux at time t=0 for different light emitting diodes.

FIG. 3B illustrates the change in luminous flux for various light-emitting diodes as a function of the operating time t in hours. From this figure, it can be seen that even the qualitative aging behavior differs for different light emitting diodes. For example, some light emitting diodes show a continuous decrease in luminous power over time, while for other light emitting diodes the luminous flux even increases in the meantime.

It is therefore not readily possible to store a typical aging curve for a light-emitting diode arrangement and, on the basis of the operating time already completed, to adjust the operating current so that the luminous power remains constant.

With the method described, the compensation of the aging can be done on the basis of a concrete measurement of current and associated voltage.

The method described is generally suitable for driving light-emitting diode arrangements in which a change in the efficiency of the light-emitting diodes due to aging leads to a significant change in the characteristic properties of the radiation. This is especially the case for light emitting diode arrangements which comprise light emitting diodes emitting in different spectral ranges. For example, the light emitting diode arrangements are part of a color mixing system or a display.

Figure 4A:
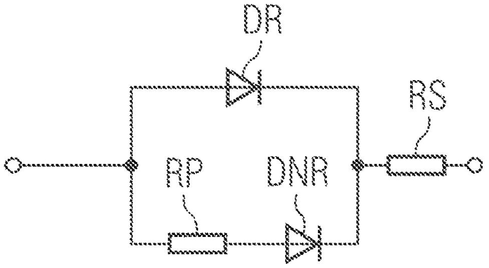
FIG. 4A shows an equivalent circuit diagram for a light emitting diode.

To determine the updated current feed, an equivalent circuit 5 for the light emitting diode can be used, as shown in FIG. 4A. Here, an ideal light-emitting diode DR is brigded by a parasitic non-radiating diode DNR with a series resistor RP. The equivalent circuit diagram 5 further shows a series resistor RS. RS represents the cumulative series resistances of the light-emitting diode. However, RS is only of minor importance for the aging of the light emitting diode. Thus, the ideal light-emitting diode DR represents an idealized light-emitting diode without non-radiative defect-assisted recombination, i.e., with an internal efficiency of light generation in the low-current regime of 100%. The ideality factor of this light-emitting diode is 1.

In contrast, the non-radiative diode DNR represents, in particular, the tunneling current without light emission at very small currents. The ideality factor of the parasitic nonradiative diode DNR is greater than 1 and is, for example, between 2 and 7 inclusive.

According to this model, the low-current efficiency of a light-emitting diode is directly proportional to the relative current flow through the radiating diode DR.

Figure 4B:
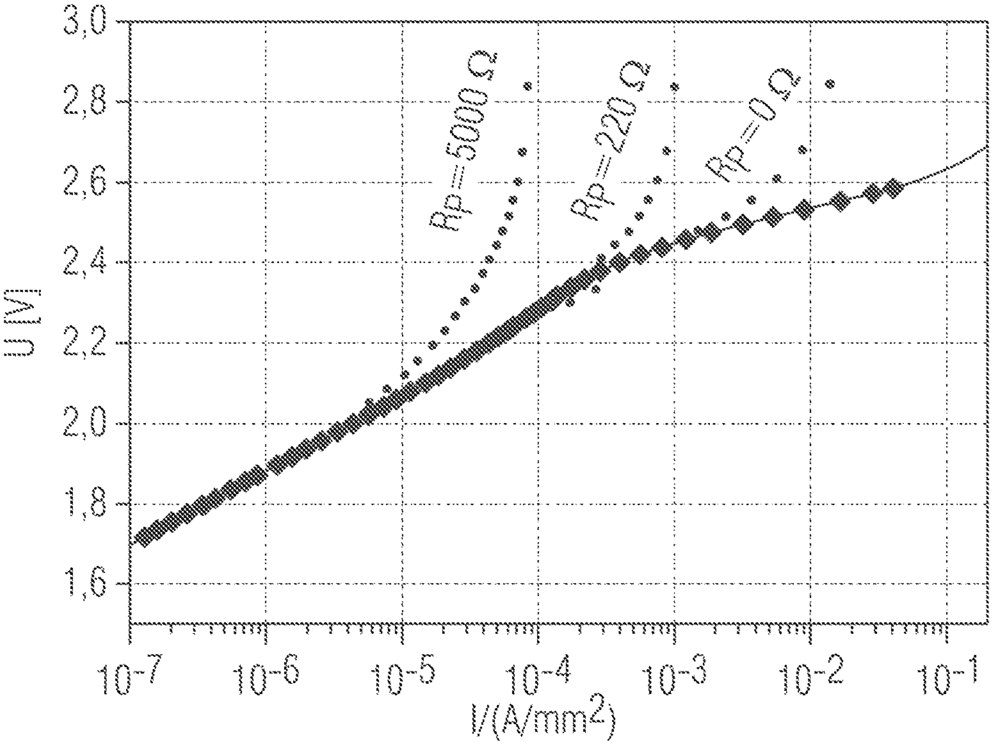
FIG. 4B shows a measurement of the voltage as a function of the current density I/(A/cm$^2$) of a light emitting diode (measured values in diamonds) with an associated fitting function (solid line) as well as curves of a current-voltage characteristic of the non-radiating diode according to the equivalent circuit of FIG. 4A for different series resistances as dotted lines.
Figure 4C:
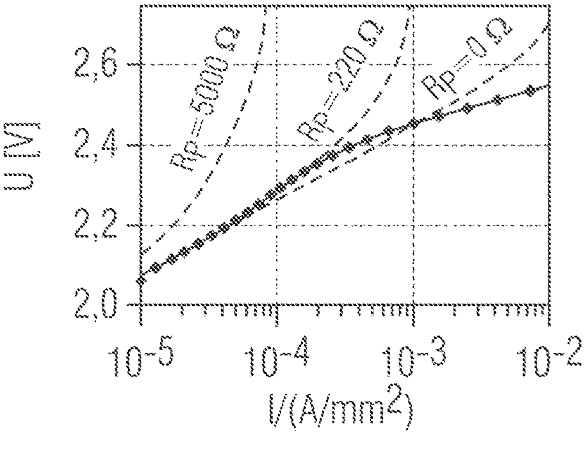
FIG. 4C shows an enlarged view of a portion of FIG. 4B.

Based on this equivalent circuit, an adjustment to a real current-voltage characteristic can be made. This is shown in FIG. 4B. FIG. 4B also shows curves for the branch of the non-radiating diode DNR with series resistances RP of 5000 Ω, 220Ω and 0Ω. From this it is clear that the series resistor RP determines the transition from a predominant current flow through the non-radiating diode DNR to a predominant current flow through the radiating diode DR. The higher the series resistor RP, the earlier this transition occurs. The ideality factor of the parasitic non-radiating diode DNR is 2.7.

Figure 4D:
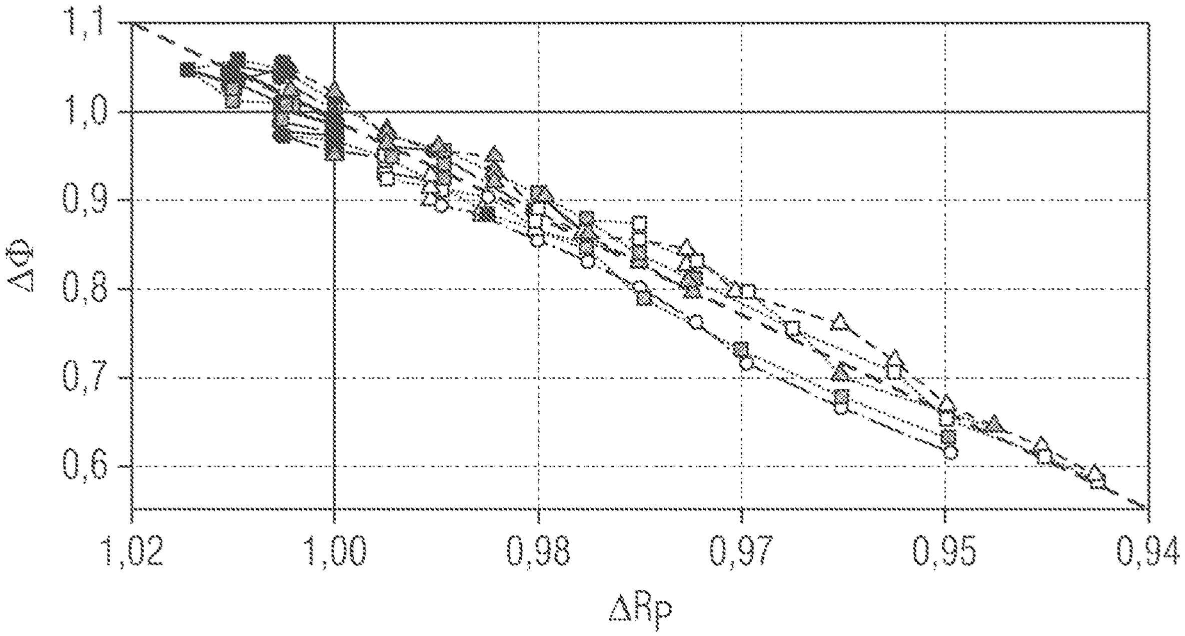
FIG. 4D shows a relative change of the luminous flux as a function of a relative change of the series resistance for different light emitting diodes, each normalized to the luminous flux as well as the series resistance at time t=0.

It can be seen from FIG. 4D that the relative change in luminous flux $\Delta\phi$, normalized at time t=0 is immediately accompanied by a relative change in resistance ΔRP, also normalized at time t=0.

Thus, when describing a light emitting diode with the equivalent circuit 5 shown in FIG. 4A, the aging can be described directly by a change in the series resistance RP, wherein the other parameters, in particular the ideality factors of the diodes, do not change.

By comparing a measured voltage value at a certain operating current in the low current regime with the original voltage at this operating current, it is therefore possible to deduce the series resistor RP. The series resistor RP thus provides a measure of the efficiency of the light-emitting diode and, in particular, of the change in efficiency due to aging. Based on the instantaneous current-voltage value pair, an updated efficiency of the light emitting diode can thus be determined.

Figure 4E:
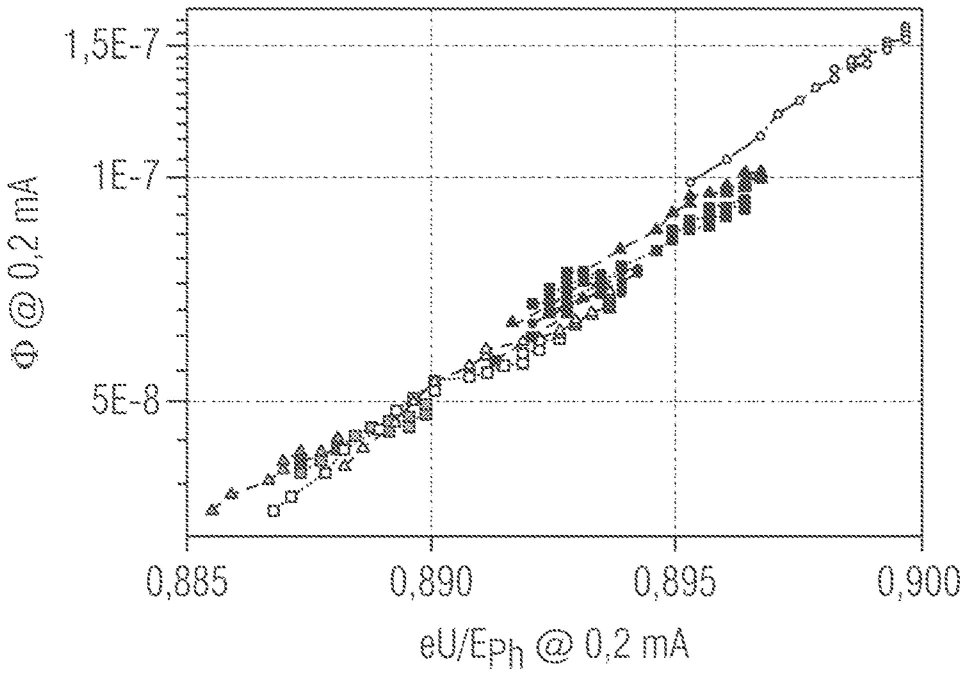
FIG. 4E shows measurements of luminous flux in arbitrary units for different light emitting diodes as a function of the ratio e*U/EPh, wherein e is the elementary charge, U is the operating voltage and EPh is the respective photon energy of the generated radiation.

From FIG. 4E, in which the luminous flux $\phi$ (is shown in terms of the ratio of elementary charge e multiplied by the operating voltage U to the photon energy EPh of the generated light, it is further clear that aging can be read directly from the voltage change and compensated for with a corresponding adjustment of the current feed. The photon energy EPh can be used to take into account that the measured light-emitting diodes emit radiation with different peak wavelengths.

In particular, it can be deduced over the entire operating range of the light emitting diode how the current feed must be adjusted for different dimming levels in order to compensate for aging effects.

More conveniently, the measurement of the instantaneous current-voltage value pair is performed at an operating current in the low current regime of the light emitting diode. When operating a light emitting diode arrangement with several light emitting diodes, the described method can be carried out for several light emitting diodes, in particular for all light emitting diodes individually, so that an updated current feed can be determined for each light emitting diode.

Figure 5:
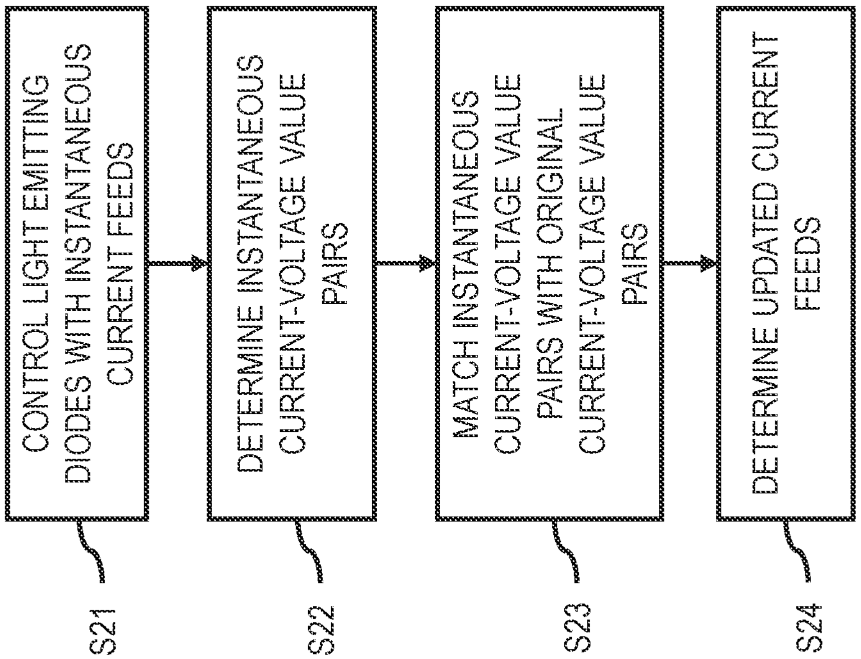
FIG. 5 shows an exemplary embodiment of a method for operating a light emitting diode arrangement.

FIG. 5 shows an exemplary embodiment of a method for operating a light emitting diode arrangement. Here, steps S21 and S22 correspond to steps S11 and S12 described in connection with FIG. 1. In contrast to the method described in connection with FIG. 1, several instantaneous current-voltage value pairs are determined. The different operating currents correspond to different dimming levels of the light emitting diode arrangement.

In step S23, the instantaneous current-voltage value pairs are matched with the stored corresponding original current-voltage value pairs. From this, a correspondingly updated current feed is determined for each of the dimming levels on the basis of the respective instantaneous current-voltage value pair (step S24).

In contrast to the exemplary embodiment described in connection with FIG. 1, the measurement of several current-voltage value pairs is thus required. In this case, it is not necessary to determine an updated efficiency of the light emitting diode based on the equivalent circuit shown in FIG. 4A.

Figure 2:
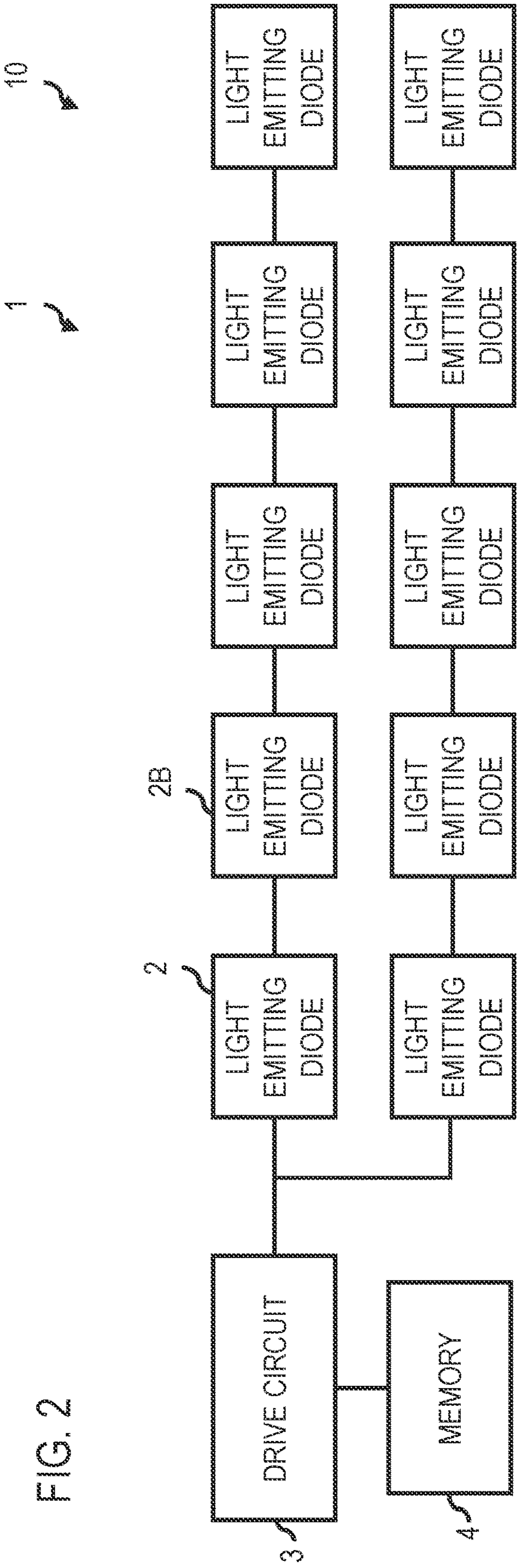
FIG. 2 shows an exemplary embodiment for a light emitting diode arrangement in schematic representation.

FIG. 2 illustrates an exemplary embodiment of a light emitting diode arrangement which is particularly suitable for the operating methods described. The light emitting diode arrangement 1 comprises a plurality of light emitting diodes 2 and a drive circuit 3. The light emitting diode arrangement is configured to determine at least one instantaneous current-voltage value pair of the light emitting diode and to determine an updated current feed for the light emitting diodes based on the instantaneous current-voltage value pair.

This can be done as explained in connection with the described operating method. For example, the light emitting diodes 2 are arranged in a matrix. For example, the light emitting diode arrangement comprises different types of light emitting diodes which are provided for generating radiation in mutually different spectral ranges, such as for generating radiation in the red, green and blue spectral ranges. For simplified illustration, only a section with eight light emitting diodes is shown, wherein one of the light emitting diodes 2 is identified as another light emitting diode 2B for simplified reference.

In particular, the light emitting diode arrangement 1 is configured to determine at least one instantaneous current-voltage value pair operating voltage for the light emitting diodes 2 in each case and to determine an updated current feed for the light emitting diodes on the basis of the respective instantaneous current-voltage value pair.

The change in efficiency can thus be derived from the change in the instantaneous current-voltage value pair compared to the corresponding original current-voltage value pair, and the current feed can be readjusted accordingly.

For example, the light emitting diode arrangement 1 comprises a memory 4 in which characteristic values for the light emitting diode 2 are stored for its original current-voltage characteristic. For example, the characteristic values are based on an equivalent circuit as shown in FIG. 4A. For example, the ideality factor of the parasitic non-radiating diode DNR, the series resistor RP and, if applicable, the series resistor RS are stored.

Alternatively or additionally, a plurality of original current-voltage value pairs are stored in the memory. By matching the instantaneous value pairs with respect to the original value pairs, aging can be deduced and a corresponding adjustment of the current feed can be made.

In such a light emitting diode arrangement 1 with a plurality of light emitting diodes, for example a light emitting diode arrangement in the form of a display device 10, it would not be readily possible to monitor the radiation emitted by the individual light emitting diodes 2 during operation. As a result, there is a risk that a change in the efficiency of the light-emitting diodes due to aging would lead to incorrect color control and/or color reproduction. This can be compensated for as described above.

In particular, light emitting diodes 2 intended for generating radiation in different spectral ranges may comprise, for example, different aging characteristics, so that by individually adjusting the aging behavior based on concrete measurements on the respective light emitting diodes 2, a reliable control of the current feed can be performed.

In such a display device 10, the color control and dimming of the individual pixels can be implemented by changing the current feed. The change of the current feed can be realized by a pulse width modulation and/or a change of the operating current of the individual pixels. For the second case, the operating current intensity can change over several orders of magnitude depending on the luminosity required in each case. Over this entire operating range, the aging effects can be compensated or at least largely compensated.

Figure 6:
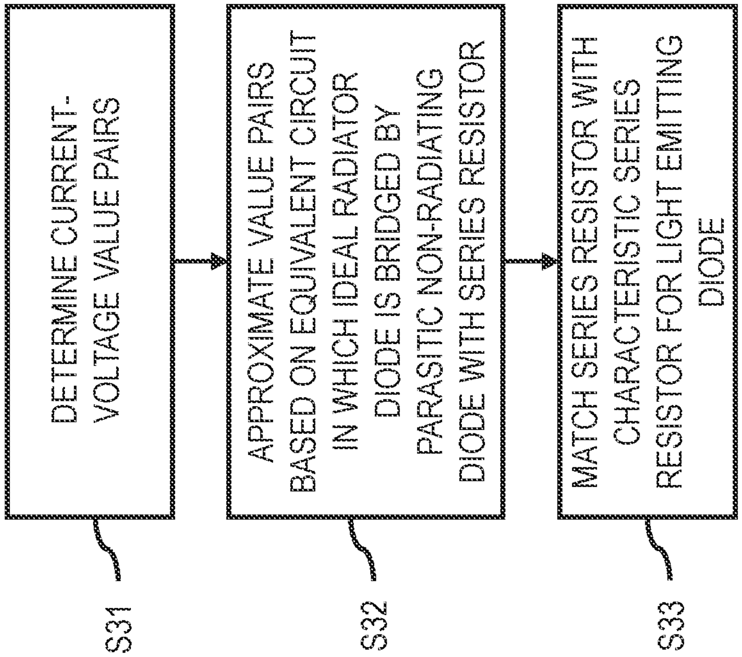
FIG. 6 shows an exemplary embodiment of a method for characterizing a light emitting diode.

FIG. 6 schematically illustrates a method for characterizing a light emitting diode. The method is particularly suitable for checking the internal efficiency of the light generation of the light emitting diode after its manufacture. For this purpose, current-voltage value pairs for the light-emitting diode are determined in a step S31. The value pairs are approximated based on an equivalent circuit in which an ideal radiating diode DR is bridged by a parasitic non-radiating diode DNR with a series resistor (step S32).

The series resistor determined in this way is matched with a characteristic series resistor for the light-emitting diode (step S33). The internal efficiency of the light-emitting diode can be deduced from this matching. In this way, the light-emitting diode can be checked with respect to an optical parameter, namely the internal efficiency of light generation, without the need for an optical measurement of the emitted light power. Rather, the characterization of the light emitting diode can be based on a purely electrical measurement of the current-voltage characteristic.

For example, the light emitting diode can be selected out if a deviation of the series resistance from the characteristic series resistance exceeds a specified tolerance value. In other words, an excessively low series resistance in the underlying equivalent circuit can be used to conclude that the internal efficiency of the light generation is too low.

The invention is not limited by the description based on the exemplary embodiments. Rather, the invention encompasses any new feature as well as any combination of features, which in particular includes any combination of features in the patent claims, even if that feature or combination itself is not explicitly specified in the patent claims or the exemplary embodiments.

LIST OF REFERENCE SIGNS

1 light emitting diode arrangement
2 light emitting diode
2B further light emitting diode
3 drive circuit
4 memory
5 equivalent circuit
DR ideal radiating diode
DNR parasitic non-radiating diode
RP series resistor
RS serial resistor
S11, S12, S13, S14 step
S21, S22, S23, S24 step
S31, S32, S33 step

The invention claimed is:

1. A method for characterizing a light-emitting diode with regard to its internal efficiency of light generation with the steps:

a) determining current-voltage value pairs for the light-emitting diode;

b) approximating the current-voltage value pairs based on a current-voltage curve of an equivalent circuit in which an ideal radiating diode is bridged by a parallel branch, the parallel branch comprising a parasitic non-radiating diode and a series resistor, wherein a resistance of the series resistor is used as a parameter for the approximation; and c) matching the resistance of the series resistor obtained by the approximation with a characteristic resistance of the series resistor for the light emitting diode to obtain information about the internal efficiency of light generation.

2. The method according to claim 1, in which the light-emitting diode is selected out if a deviation of the series resistor from the characteristic series resistor exceeds a specified tolerance value.

3. A light-emitting diode arrangement with at least one light-emitting diode and a drive circuit, wherein the light-emitting diode arrangement is configured to determine an instantaneous current-voltage value pair of the light-emitting diode and to determine an updated current feed for the light-emitting diode on the basis of the instantaneous current-voltage value pair, an updated efficiency of the light emitting diode is determined for different dimming levels based on the deviation between the instantaneous current-voltage value pair and the original current-voltage value pair, and the determination of the updated efficiency of the light-emitting diode is based on an equivalent circuit in which an ideal radiating diode is bridged by a parallel branch, the parallel branch comprising a parasitic non-radiating diode and a series resistor.

4. The light emitting diode arrangement according to claim 3, wherein the light emitting diode arrangement is a display device with a plurality of light emitting diodes, wherein the light emitting diode arrangement is configured to determine an instantaneous current-voltage value pair for each of the light emitting diodes and to determine an updated current feed for the light emitting diodes based on the respective instantaneous current-voltage value pairs.

5. The light emitting diode arrangement according to claim 3, wherein the light-emitting diode arrangement comprises a memory in which characteristic values for the light-emitting diode are stored for its original current-voltage characteristic.

6. The light-emitting diode arrangement according to claim 3, wherein the light-emitting diode arrangement comprises a memory in which a plurality of original current-voltage value pairs are stored for the light-emitting diode.

7. The light emitting diode arrangement according to claim 3, wherein the light emitting diode arrangement can be calibrated on the basis of an original current-voltage characteristic.

8. A method for operating a light emitting diode arrangement with at least one light emitting diode comprising the steps:

a) determining at least one instantaneous current-voltage value pair;

b) matching the instantaneous current-voltage value pair with an original current-voltage value pair; and c) determining an updated current feed based on the matching and driving the light emitting diode with the updated current feed;

wherein an updated efficiency of the light emitting diode is determined for different dimming levels based on the deviation between the instantaneous current-voltage value pair and the original current-voltage value pair, and the determination of the updated efficiency of the light-emitting diode is based on an equivalent circuit in which an ideal radiating diode is bridged by a parallel branch, the parallel branch comprising a parasitic non-radiating diode and a series resistor.

9. The method of claim 8, wherein aging of the light emitting diode is at least partially compensated for by determining the updated current feed.

10. The method of claim 8, wherein the light emitting diode arrangement comprises at least one further light emitting diode and wherein an updated current feed is determined for the further light emitting diode on the basis of an individually determined instantaneous current-voltage value pair.

11. The method of claim 8, wherein a current is in the low current regime of the light emitting diode when the instantaneous current-voltage value pair is determined.

12. The method of claim 8, wherein the light emitting diode arrangement is configured to operate the light emitting diode with a plurality of dimming levels, and an associated updated current feed is determined for each dimming level.

13. The method of claim 8, wherein an updated series resistor is determined based on the instantaneous current-voltage value pair, and the updated current feed is determined based on the updated series resistor.

14. The method of claim 8, wherein a respective instantaneous current-voltage-value pair is determined for a plurality of dimming levels, and a correspondingly updated current feed for the dimming level is determined for the dimming levels on the basis of the respective associated instantaneous current-voltage value pair.

* * * * *